United States Patent

[11] 3,610,305

| [72] | Inventors | Mikio Suekane<br>Saitamaken;<br>Fumiko Noguchi, Tokyo; Chikako Satake,<br>Tokyo, all of Japan |
|---|---|---|
| [21] | Appl. No. | 848,076 |
| [22] | Filed | Aug. 6, 1969 |
| [45] | Patented | Oct. 5, 1971 |
| [73] | Assignee | Best Foods Company Ltd. |

[54] METHOD OF DEHULLING CEREAL GRAINS
7 Claims, No Drawings

[52] U.S. Cl. ............................................. 146/235
[51] Int. Cl. ............................................. B02b 3/12
[50] Field of Search ........................... 146/231–235, 221.8, 221.9

[56] References Cited

UNITED STATES PATENTS

| 7,647 | 9/1850 | Carpenter | 146/235 X |
| 1,051,582 | 1/1913 | Heinemann | 146/235 X |
| 1,849,786 | 3/1932 | Bloede et al. | 146/233 X |
| 2,007,693 | 7/1935 | Ruter et al. | 146/221.8 UX |

FOREIGN PATENTS

| 1,376 | 1856 | Great Britain | 146/221.8 |
| 884 | 1880 | Great Britain | 146/221.8 |

*Primary Examiner*—William S. Lawson
*Attorneys*—Frank E. Robbins, Joseph Shekleton, Janet E. Price, Robert D. Weist, Martha A. Michaels and Dorothy R. Thumler ABSTRACT: A method of dehulling cereal grains without reducing their starch content or germination potential. The method consists in contacting the grains with sulfuric acid or hydrochloric acid for a sufficient time to effect decomposition of the hulls and release them form the remainder of the grain.

METHOD OF DEHULLING CEREAL GRAINS

Corn grains generally are dehulled by first soaking or steeping them to soften the hulls and partially release them from the remainder of the grain. Usually the steeping is carried out in a dilute sulfurous acid solution for about 48 hours. The hulls thus released are separated from the remainder of the grain by passage over screens. The hulls which still remain adherent to the grain are removed by several grind and sieving operations.

To date there is not available a simple chemical method of cleanly removing the hulls from cereal grains without affecting the starch content and other valuable constituents of the grains which one is ultimately attempting to recover in good yield. If a simple yet efficient method of cleanly removing the hulls from cereal grains were known, such process would be a distinct advance in the art.

It therefore becomes an object of the invention to provide a new method of dehulling cereal grains.

A specific object of the invention is to dehull corn grains by breakdown or decomposition of the hulls without reducing the starch content during the treatment.

A still further object of the invention is to carry out the above act of dehulling in an extremely short period of time.

Still another object is to make more readily available grain hulls as a source of pentosans and the like.

Other objects will appear hereinafter.

In accordance with the invention a new and improved method of dehulling cereal grains has been discovered. In its broadest aspects the invention comprises the concept of effecting lysis of the hulls without reducing the starch content and other valuable principles of the grains. Specifically, the invention is carried out by contacting the grains with sulfuric acid or hydrochloric acid for a sufficient time to effect lysis or decomposition of the hulls and release or free the hulls from the remainder of the grain.

The reagent used to carry out the aims of the invention is as indicated either sulfuric acid or hydrochloric acid. The concentration of the acid may very within a wide range and the time required to accomplish the dehulling is inversely proportional to the concentration of the sulfuric or hydrochloric acid used for the purpose. Thus, the use of dilute acid requires a longer treating time than the use of a concentrated acid. In most instances, it is desirable to use an acid of concentration within the range of from about 10 percent to about 75 percent (by weight). The ordinary hydrochloric acid which is commercially available, having a concentration of 37 percent, is a suitable dehulling agent. Preferred concentrations of hydrochloric acid for use herein are those within the range of from about 10 percent to about 37 percent whereas preferred concentrations of sulfuric acid are those within the range of from about 10 percent to about 75 percent.

To dehull cereal grains in accordance with this invention one need simply immerse them in the sulfuric or hydrochloric acid until the hulls are removed. Mild agitation may be employed, if desired. Generally, the dehulling is carried out in a surprisingly short time, e.g., less than a minute. In a typical situation the dehulling is complete in from about one-half a minute up to about 3 minutes.

Best results are usually realized when the acid treatment is effected at above room temperature, i.e., within the range of from about 40° C. to about 90° C. As noted earlier, the dehulling time decreases as the treatment temperature is raised or the concentration of sulfuric acid is increased.

The amount of sulfuric or hydrochloric acid which should be used may vary from the minumum amount required to wet the surface of the grain to any larger amount which facilitates the handling of the grains and acid. Generally, one liter of acid is sufficient to treat 2 kilograms of grain and this ratio usually will be found to be satisfactory.

The process is applicable to cereal grains generally, including corn, rice, wheat, maize, milo, etc. Corn is preferred because of its particular utility in the process.

A notable advantage of the process is the production of a product having substantially the same starch content as its hull-containing precursor. Furthermore, the fat content and protein content likewise remain substantially unchanged.

The following examples illustrate typical runs falling within the preview of the invention. All parts and percentages are expressed in terms of weight unless otherwise indicated. It is understood that these examples are meant to illustrate the invention, and not to limit it in any way.

EXAMPLE I

Dry corn is agitated with aqueous sulfuric acid for approximately 2 minutes. The hulls are completely removed after this period of time and the corn washed with water and then soaked in 10 percent aqueous calcium carbonate slurry to remove the last traces of sulfuric acid. The corn is analyzed before and after acid treatment. As shown in table I below, crude fiber and nitrogen-free extract (excluding starch) are substantially removed, without affecting the starch content to any appreciable degree.

TABLE I.—ACID TREATMENT OF CORN

| Corn component | Acid-treated corn | | Untreated corn | | Loss by treatment | |
| --- | --- | --- | --- | --- | --- | --- |
| | Content (percent) | Weight (percent) | Content (percent) | Weight (g). | Weight (g.) | Ratio (percent) |
| Protein | 11.8 | 9.55 | 11.0 | 9.54 | −0.01 | |
| Fat | 5.87 | 4.76 | 5.85 | 5.07 | 0.31 | 6.0 |
| Ash | 1.35 | 1.09 | 1.16 | 1.01 | −0.08 | |
| Fiber | 0.22 | 0.18 | 0.80 | 0.69 | 0.51 | 74.0 |
| Starch | 79.8 | 64.55 | 74.4 | 64.5 | −0.05 | |
| Nitrogen-free extract [1] | 0.94 | 0.76 | 6.79 | 5.89 | 5.13 | 87.0 |
| Totals | 100.0 | 80.89 | 100.0 | 86.7 | 5.81 | 167.0 |

[1] Excluding starch.

EXAMPLE II

In a further series of experiments corn grains are treated with sulfuric acid of varying concentrations, at differing temperatures and for various periods of time. As clearly shown in table II below, good results are obtained in terms of effective dehulling under the variety of conditions just mentioned.

TABLE II

RESULTS OF ACID TREATMENT ON CORN GRAINS

| % Concentration | Temperature °C | Dehulling time min.:sec |
| --- | --- | --- |
| 30 | 50 | 2:00 |
| 30 | 60 | 1:30 |
| 30 | 70 | 1:00 |
| 30 | 80 | 0:45 |
| 40 | 50 | 1:30 |
| 40 | 60 | 1:00 |
| 40 | 70 | 0:45 |
| 40 | 80 | 0:40 |
| 50 | 50 | 1:30 |
| 50 | 60 | 0:45 |
| 50 | 70 | 0:40 |
| 50 | 80 | 0:30 |

It is interesting to note here that some of the corn grains treated with sulfuric acid germinated within 5 days. This demonstrates the fact that the embryo bud of the treated corn grain is left intact during the treatment.

EXAMPLE III

The procedure of example I is repeated using 37 percent hydrochloric acid instead of sulfuric acid. The temperature is maintained at 50° C. The total time required for complete dehulling is 30 seconds.

EXAMPLE IV

The procedure of example I is repeated using 25 percent hydrochloric acid instead of sulfuric acid. The temperature is maintained at 50° C. The total time required for complete dehulling is 1.5 minutes.

The number of other acids were tried as dehulling agents. Specifically, corn grains are treated with a 40 percent concentrated aqueous solution of oxalic acid at 80° C. The dehulling time here is relatively long, i.e. approximately 6½ minutes. This comparable to a similar experiment involving the use of sulfuric acid at the same concentration at the same temperature wherein the dehulling time is approximately 40 seconds.

In other experiments glacial acetic acid and lactic acid are used to treat corn grains at 80° C. In these cases, even after 20 minutes, dehulling is not observed.

Acid-dehulled corn produced by the process of this invention is characterized by improved water absorption properties, e.g. about 50 percent more water is absorbed by such acid-dehulled corn than by its full-containing precursor.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth.

We claim:

1. A method of dehulling cereal grains without reducing the starch content thereof, which comprises contacting cereal grains with sulfuric acid or hydrochloric acid of concentration ranging from about 10 percent to about 75 percent, for from about 10 seconds to about 3 minutes, to cause the hulls of the grains to become disengaged from the grains.
2. The method of claim 1 wherein the acid is sulfuric acid.
3. The method of claim 1 wherein the cereal grain is corn.
4. The method of claim 1 wherein the cereal grain is rice.
5. The method of claim 1 wherein the cereal grain is wheat.
6. The method of claim 1 wherein the cereal grain is milo.
7. The method of claim 1 wherein the acid is maintained at a temperature within the range of from about 40° C. to about 90° C.